(12) United States Patent
Dubnicki et al.

(10) Patent No.: US 8,140,625 B2
(45) Date of Patent: Mar. 20, 2012

(54) METHOD FOR OPERATING A FIXED PREFIX PEER TO PEER NETWORK

(75) Inventors: Cezary Dubnicki, Monmouth Junction, NJ (US); Leszek Gryz, Princeton, NJ (US); Krzysztof Lichota, Warszawa (PL); Cristian Ungureanu, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 440 days.

(21) Appl. No.: 12/023,141

(22) Filed: Jan. 31, 2008

(65) Prior Publication Data

US 2008/0201428 A1  Aug. 21, 2008

Related U.S. Application Data

(60) Provisional application No. 60/890,661, filed on Feb. 20, 2007.

(51) Int. Cl.
*G06F 15/16* (2006.01)
*G06F 7/00* (2006.01)
(52) U.S. Cl. .......... 709/205; 709/206; 707/E17.032
(58) Field of Classification Search .......... 709/205–206; 707/10, 100, E17, 32, 395.32, E17.032
See application file for complete search history.

(56) References Cited

U.S. PATENT DOCUMENTS

2004/0215622 A1   10/2004  Dubnicki et al.
2005/0135381 A1*  6/2005  Dubnicki et al. ........ 370/395.32
2007/0050590 A1*  3/2007  Syed et al. ................. 711/170
2007/0208748 A1   9/2007  Li
2008/0005334 A1   1/2008  Utard et al.

OTHER PUBLICATIONS

Ben-Or, M., "Another Advantage of Free Choice: Completely Asynchronous Agreement Protocols", Proc. 2nd ACM Symposium Principles Distributed Computing, p. 27-30, 1983.
Dubnicki, C., et al., "FPN: A Distributed Hash Table for Commercial Applications", 13th IEEE Int'l. Symposium High Pert Dist. Computing, p. 120-128, 2004.
Geels, D., "Data Replication in OceanStore", University of California, (EECS) Report No. UCB/CSD-02-1217, 2002.
Hildrum, K., et al., "Distributed Object Location in a Dynamic Network", Proc. 14th ACM Symposium on Parallel Algorithms and Architectures, p. 41-52, 2002.
Leslie, M., et al., "Replication Strategies for Reliable Decentralised Storage", IEEE Computer Society, Proc. 1st Int'l. Conf., ARES, 2006.
Lynch, N., et al., "Atomic Data Access in Distributed Hash Tables", Lecture Notes in Comp. Sci., 2429, p. 295-305, IPTPS, 2002.
Schneider, F., "Implementing Fault-Tolerant Services Using the State Machine Approach: A Tutorial", ACM Comp. Surveys, 22(4), p. 299-319, 1990.

* cited by examiner

*Primary Examiner* — Peling Shaw
(74) *Attorney, Agent, or Firm* — James Bitetto; Joseph Kolodka (57) ABSTRACT

A fixed prefix peer to peer network has a number of physical nodes. The nodes are logically divided into a number of storage slots. Blocks of data are erasure coded into original and redundant data fragments and the resultant fragments of data are stored in slots on separate physical nodes such that no physical node has more than one original and/or redundant fragment. The storage locations of all of the fragments are organized into a logical virtual node (e.g., a supernode). Thus, the supernode and the original block of data can be recovered even if some of the physical nodes are lost.

20 Claims, 8 Drawing Sheets

| | Prefix | Index | Version |
|---|---|---|---|
| Supernode 226 | 01101 | Cardinality = 6 | 2 |
| Component 214a | 01101 | 0 | 1 |
| Component 216c | 01101 | 1 | 1 |
| Component 218b | 01101 | 2 | 2 |
| Component 220d | 01101 | 3 | 2 |
| Component 222a | 01101 | 4 | 1 |
| Component 224a | 01101 | 5 | 1 |
| Supernode A | 01100 | Cardinality = 5 | 1 |
| ⋮ | ⋮ | ⋮ | ⋮ |

METHOD FOR OPERATING A FIXED PREFIX PEER TO PEER NETWORK

This application claims the benefit of U.S. Provisional Application No. 60/890,661 filed Feb. 20, 2007 which is incorporated herein by reference.

BACKGROUND OF THE INVENTION

The present invention relates generally to peer to peer networking and more particularly to storing data in peer to peer networks.

Peer to peer networks for storing data may be overlay networks that allow data to be distributively stored in the network (e.g., at nodes). In the peer to peer networks, there are links between any two peers (e.g., nodes) that know each other. That is, nodes in the peer to peer network may be considered as being connected by virtual or logical links, each of which corresponds to a path in the underlying network (e.g., a path of physical links). Such a structured peer to peer network employs a globally consistent protocol to ensure that any node can efficiently route a search to some peer that has a desired file or piece of data. A common type of structured peer to peer network uses a distributed hash table (DHT) in which a variant of consistent hashing is used to assign ownership of each file to a particular peer in a way analogous to a traditional hash table's assignment of each key to a particular array slot.

However, traditional DHTs do not readily support data redundancy and may compromise the integrity of data stored in systems using DHTs. To overcome these obstacles, data items are N-way replicated, but this results in high storage overhead and often requires multiple hashing functions to locate copies of the data. Further, it is difficult to add support for monitoring data resiliency and automatic rebuilding of missing data.

Accordingly, improved systems and methods of organizing and storing data in peer to peer networks are required.

BRIEF SUMMARY OF THE INVENTION

The present invention generally provides a method of operating a fixed prefix peer to peer network having a plurality of physical nodes logically divided into storage slots. A set of the storage slots host components and are logically organized into a virtual node. A physical node receives a message with identification information indicative of a version of a component hosted on another physical node, determines a relative age of the component based on the identification information, and if the version of the component hosted on the second physical node is newer than a version of the component hosted on the node, stores the identification information as a component skeleton at a storage slot on the node. The node also determines if the identification information stored at the storage slot on the first physical node activates a component and, if the identification information activates the component, activates the component by hosting the component on the node.

The present invention further provides a method of operation a node of a peer to peer network having a plurality of physical nodes each having a plurality of storage slots. The peer to peer network stores data in the plurality of storage slots, associates a plurality of components with a plurality of the storage slots, associates each component with the physical node that has the storage slot that hosts the component, associates a set of the components logically as a virtual node where the virtual node comprises storage slots from a plurality of the physical nodes, facilitates communication between the physical nodes associated with the components to determine if a component is lost, and if a component is lost, initiates a recovery procedure. The recovery procedure involves evaluating a plurality of new host locations for a replacement component, voting on the plurality of replacement locations, and creating a replacement component from data in the original components.

These and other advantages of the invention will be apparent to those of ordinary skill in the art by reference to the following detailed description and the accompanying drawings.

DETAILED DESCRIPTION

The present invention extends the concept of Distributed Hash Tables (DHTs) to create a more robust peer to peer network. The improved methods of storing data described herein allow for a simple DHT organization with built-in support for multiple classes of data redundancy which have a smaller storage overhead than previous DHTs. Embodiments of the invention also support automatic monitoring of data resilience and automatic reconstruction of lost and/or damaged data.

The present invention provides greater robustness and resiliency to the DHT-based peer to peer network known as a Fixed Prefix Network (FPN) disclosed in U.S. patent application Ser. No. 10/813,504, filed Mar. 30, 2004, now U.S. Pat. No. 7,304,994, issued on Dec. 4, 2007, and incorporated herein by reference. Unlike traditional peer to peer networks, FPNs and networks according to the present invention, known as FPNs with Supernodes (FPN/SN), are constructed such that the contributed resources (e.g., nodes) are dedicated to the peer to peer system and the systems are accordingly significantly more stable and scalable.

Figure 1:
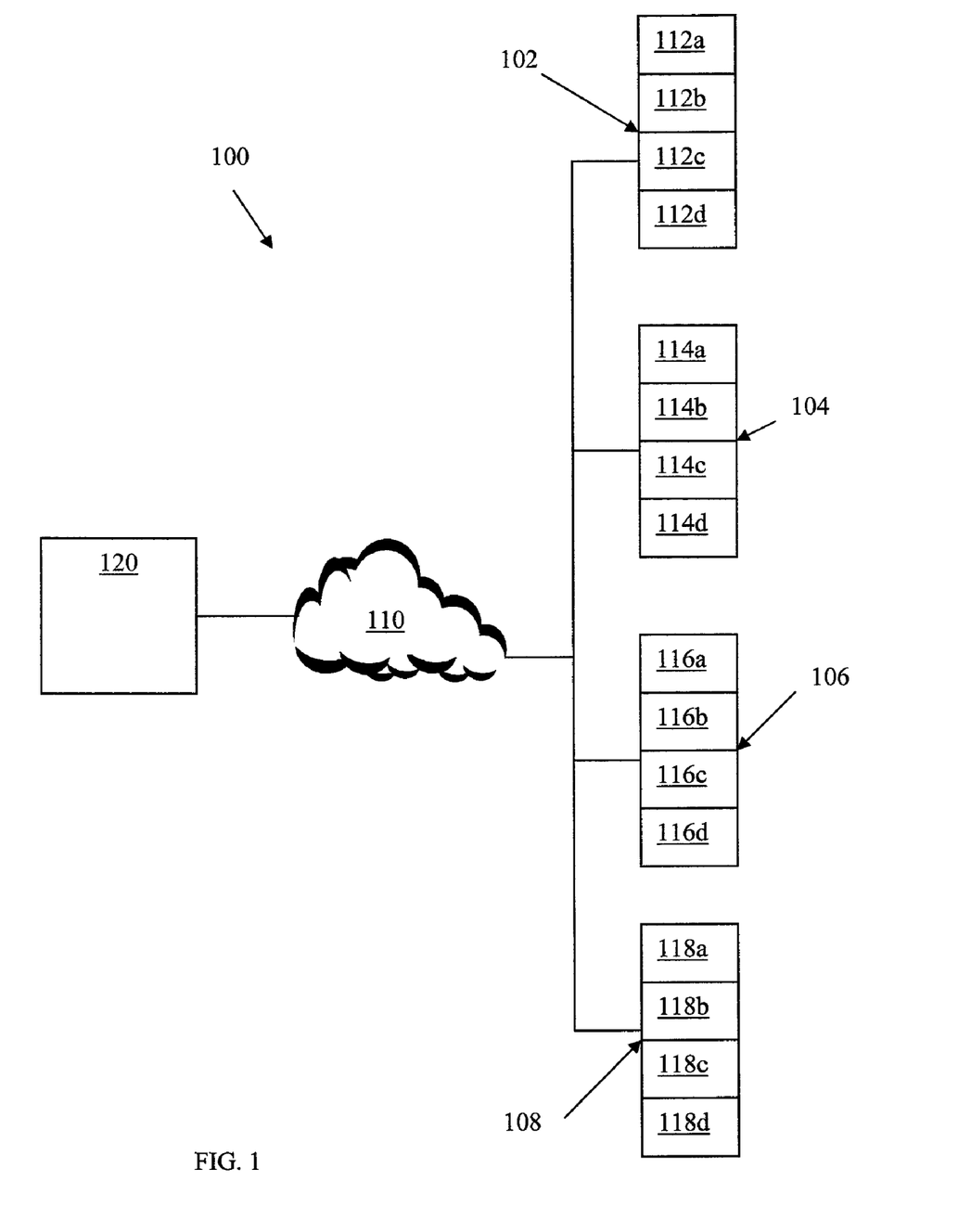
FIG. 1 is a diagram of an exemplary peer to peer network according to an embodiment of the invention.
Figure 2:
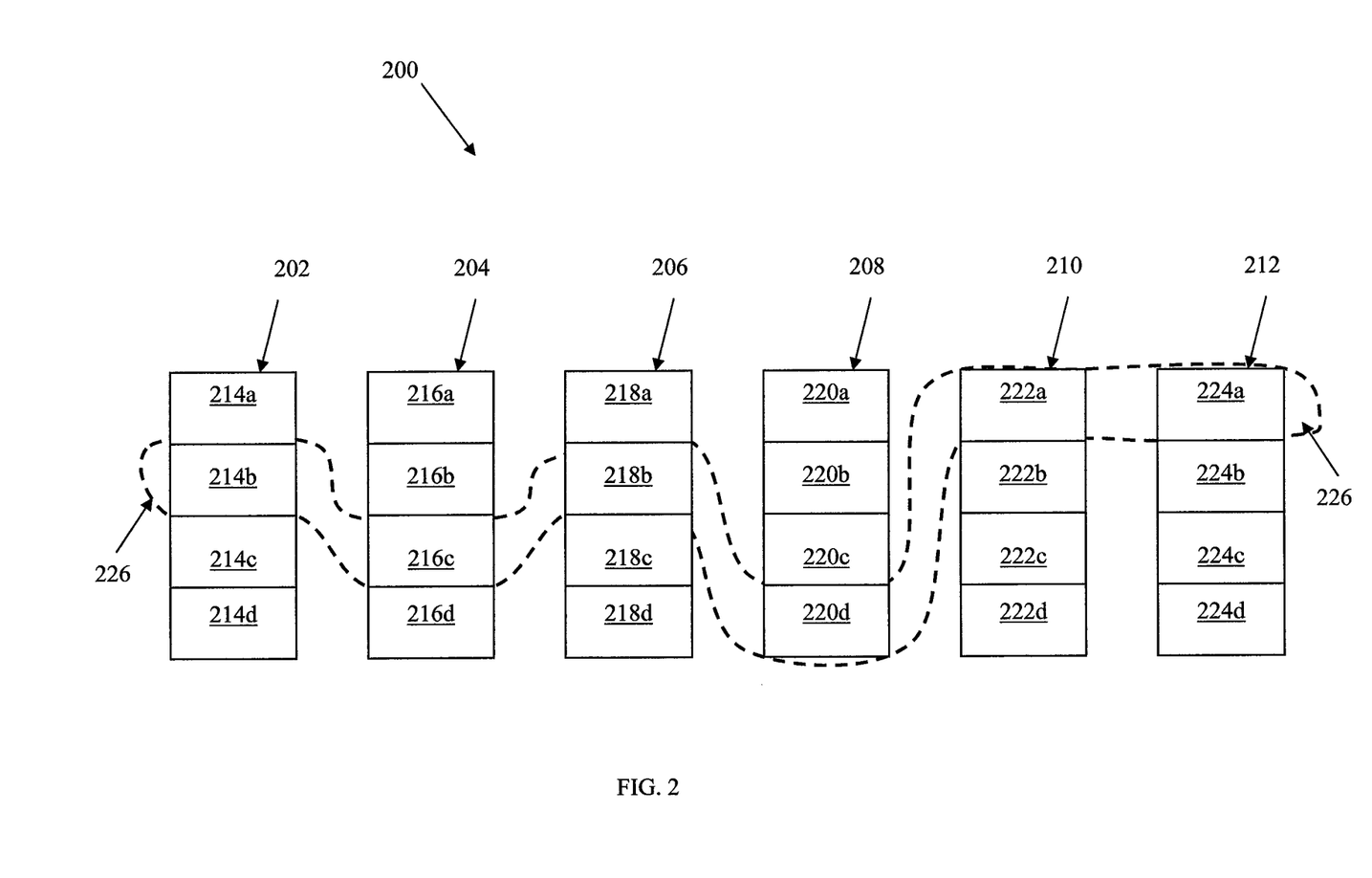
FIG. 2 is a diagram of an exemplary peer to peer network according to an embodiment of the invention.
Figure 3:
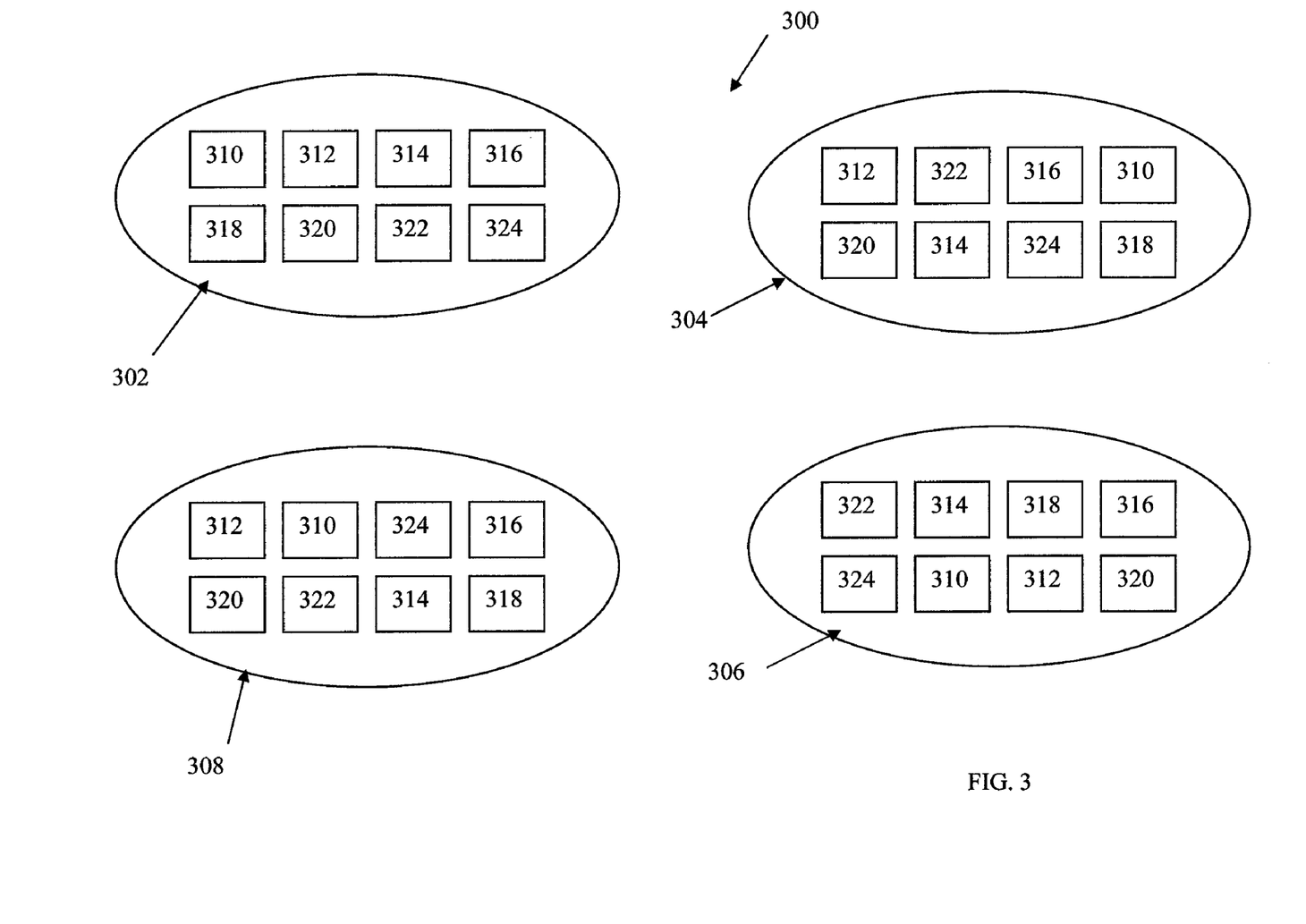
FIG. 3 is a diagram of an exemplary peer to peer network according to an embodiment of the invention.

FIGS. 1-3 depict various illustrative embodiments of peer to peer networks utilizing FPN/SNs. FIGS. 1-3 are exemplary diagrams to illustrate the various structures and relationships described below and are not meant to limit the invention to the specific network layouts shown.

FIG. 1 is a diagram of an exemplary peer to peer network 100 for use with an embodiment of the present invention. The peer to peer network 100 has a plurality of physical nodes 102, 104, 106, and 108 that communicate with each other through an underlying transport network 110 as is known. There is no restriction on the location, grouping, or number of the physical nodes 102-108 with regards to the present invention. Though depicted in FIG. 1 as four physical nodes 102-

108, it is understood that any number of nodes in any arrangement may be utilized. Similarly, the physical nodes 102-108 may vary in actual storage space, processing power, and/or other resources.

Physical nodes 102-108 each have associated memories and/or storage areas (not shown) as is known. The memories and/or storage areas of physical nodes 102-108 are each logically divided into a plurality of slots approximately proportional to the amount of storage available to each physical node. That is, the memory and/or storage area of physical node 102 is logically divided into approximately equivalent-sized slots 112*a*, 112*b*, 112*c*, and 112*d*, the memory and/or storage area of physical node 104 is logically divided into approximately equivalent-sized slots 114*a*, 114*b*, 114*c*, and 114*d*, the memory and/or storage area of physical node 106 is logically divided into approximately equivalent-sized slots 116*a*, 116*b*, 116*c*, and 116*d*, and the memory and/or storage area of physical node 108 is logically divided into approximately equivalent-sized (e.g., in terms of storage capacity) slots 118*a*, 118*b*, 118*c*, and 118*d*. A physical node may be logically divided in that its memory and/or storage allocation may be allocated as different storage areas (e.g., slots). Physical nodes 102-108 may be divided into any appropriate number of slots, the slots being representative of an amount of storage space in the node. In other words, data may be stored in the nodes 102-108 in a sectorized or otherwise compartmentalized manner. Of course, any appropriate division of the storage and/or memory of physical nodes 102-108 may be used and slots 112*a-d*, 114*a-d*, 116*a-d*, and 118*a-d* may be of unequal size. Further, slot size may not be static and may grow or shrink and slots may be split and/or may be merged with other slots.

Each physical node 102-108 is responsible for the storage and retrieval of one or more objects (e.g., files, data, pieces of data, data fragments, etc.) in the slots 112*a-d*, 114*a-d*, 116*a-d*, and 118*a-d*, respectively. Each object may be associated with a preferably fixed-size hash key of a hash function. In operation, one or more clients 120 may communicate with one or more of physical nodes 102-108 and issue a request for a particular object using a hash key.

Slots 112*a-d*, 114*a-d*, 116*a-d*, and 118*a-d* may also each be associated with a component of a virtual (e.g., logical) node (discussed in further detail below with respect to FIGS. 2 and 3). Herein, components are not physical entities, but representations of a portion of a virtual node. That is, components may be logical representations of and/or directions to or addresses for a set or subset of data that is hosted in a particular location in a node (e.g., hosted in a slot). Storage locations of data fragments (e.g., data fragments discussed below) are logically organized into a virtual node.

FIG. 2 is a diagram of a portion of an exemplary peer to peer network 200 for use with an embodiment of the present invention. The peer to peer network 200 is similar to peer to peer network 100 and has a plurality of physical nodes 202, 204, 206, 208, 210, and 212 similar to physical nodes 102-108. Physical nodes 202-212 are each logically divided into a plurality of slots approximately proportional to the amount of storage available to each physical node. That is, physical node 202 is divided logically into slots 214*a*, 214*b*, 214*c*, and 214*d*, physical node 204 is divided logically into slots 216*a*, 216*b*, 216*c*, and 216*d*, physical node 206 is divided logically into slots 218*a*, 218*b*, 218*c*, and 218*d*, physical node 208 is divided logically into slots 220*a*, 220*b*, 220*c*, and 220*d*, physical node 210 is divided logically into slots 222*a*, 222*b*, 222*c*, and 222*d*, and physical node 212 is divided logically into slots 224*a*, 224*b*, 224*c*, and 224*d*. For simplicity of discussion and depiction in FIG. 2, since each slot 214*a-d*, 216*a-d*, 218*a-d*, 220*a*-d, 222*a-d*, and 224*a-d* hosts a component, the component corresponding to its host slot is referred to herein with the same reference numeral. For example, the component hosted in slot 214*c* of physical node 202 is referred to as component 214*c*.

A grouping of multiple components is referred to as a virtual node (e.g., a "supernode"). In the example of FIG. 2, supernode 226 comprises components 214*b*, 216*c*, 218*b*, 220*d*, 222*a*, and 224*a*. A virtual node (e.g., supernode) is thus a logical grouping of a plurality of storage locations on multiple physical nodes. The supernode may have any number of components—where the number of components is the supernode cardinality (e.g., the number of components in a supernode)—associated with any number of physical nodes in a network and a supernode need not have components from every physical node. However, each component of a supernode must be hosted in slots on different physical nodes. That is, no two components in a supernode should be hosted at the same physical node. The total number of components in a supernode may be given by a predetermined constant—supernode cardinality. In some embodiments, the supernode cardinality may be in the range of 4-32. The supernode cardinality may be a predetermined (e.g., desired, designed, etc.) number of data fragments.

In some embodiments, a larger supernode cardinality is chosen to increase flexibility in choosing data classes. In alternative embodiments, a smaller supernode cardinality is chosen to provide greater access to storage locations (e.g., disks) in read/write operations. Here, data classes define a level of redundancy where lower data classes (e.g., data class low) have less redundancy and higher data classes (e.g., data class high) have more redundancy. There may be a number of data classes equal to the predetermined supernode cardinality. The lowest data class is defined as having no redundant fragment and the highest class is defined as having (supernode cardinality—1) redundant fragments.

In an exemplary embodiment, data class low may refer to a single redundant fragment and data class high may refer to four redundant fragments. Of course, any appropriate number of data fragments may be set for data class low and/or data class high. In this exemplary embodiment, data blocks that are classified by user as data class low will be divided into a number of fragments equal to a supernode cardinality, where there are (supernode cardinality—1) original fragments and one redundant fragment. Accordingly, one fragment may be lost and the data block may be recreated. Using data class high (e.g., four redundant fragments) a block of data will be divided into fragments such that four of them will be redundant. Thus, four fragments may be lost and the original block of data may be recreated. Fragmentation, especially redundant fragments, is described in concurrently filed, commonly assigned and co-pending U.S. patent application Ser. No. 12/023,133, filed on Jan. 31, 2008, entitled "Method and Apparatus for Storing Data in a Peer to Peer Network," incorporated by reference herein.

Components of the supernode may be considered peers and may similarly associated (e.g., in a hash table, etc.), addressed, and/or contacted as peer nodes in a traditional peer to peer network.

FIG. 3 depicts a high level abstraction of an exemplary peer to peer network 300 according to an embodiment of the invention. Peer to peer network 300 is similar to peer to peer networks 100 and 200 and has multiple physical nodes 302, 304, 306, and 308. Each of the physical nodes 302-308 is divided into multiple slots as described above. In the particular example of FIG. 3, each of the physical nodes 302-308 has eight slots. As in FIG. 2, each slot 310, 312, 314, 316, 318, 320, 322, or 324 hosts a component 310, 312, 314, 316, 318, 320, 322, or 324. Components 310-324 are each associated with a corresponding supernode and are distributed among the physical nodes 302-308. In this way, eight supernodes are formed, each with one component 310-324 on each of the four physical nodes 302-308. For example, a first supernode is formed with four components—component 310 hosted on physical node 302 (e.g., in a slot 310), component 310 hosted in physical node 304 (e.g., in a slot 310), component 310 hosted in physical node 306 (e.g., in a slot 310), and component 310 hosted in physical node 308 (e.g., in a slot 310). The first supernode, comprising components 310, is shown as dashed boxes. A second supernode comprises the four components 312 hosted in physical nodes 302-308 and is shown as a trapezoid. Of course, these are merely graphical representations to highlight the different components comprising different supernodes and are not meant to be literal representations of what a slot, component, node, or supernode might look like. The remaining six supernodes are formed similarly.

To facilitate data storage using the supernodes as described and shown in FIGS. 1-3, the fixed prefix network model of DHTs (e.g., FPN) may be extended to use supernodes. Any advantageous hashing function that maps data (e.g., objects, files, etc.) to a fixed-size hash key may be utilized in the context of the present invention. The hash keys may be understood to be fixed-size bit strings (e.g., 5 bits, 6 bits, etc.) in the space containing all possible combinations of such strings. A subspace of the hashkey space is associated with a group of bits of the larger bit string as is known. For example, a group of hash keys beginning with 110 in a 5 bit string would include all hash keys except those beginning with 000, 001, 010, 011, 100, and 101. That is, the prefix is 110. Such a subspace of the hashkey space may be a supernode and a further specification may be a component of the supernode. The prefix may be fixed for the life of a supernode and/or component. In such embodiments, the peer to peer network is referred to as a fixed-prefix peer to peer network. Other methods of hashing may be used as appropriate.

Figure 4:
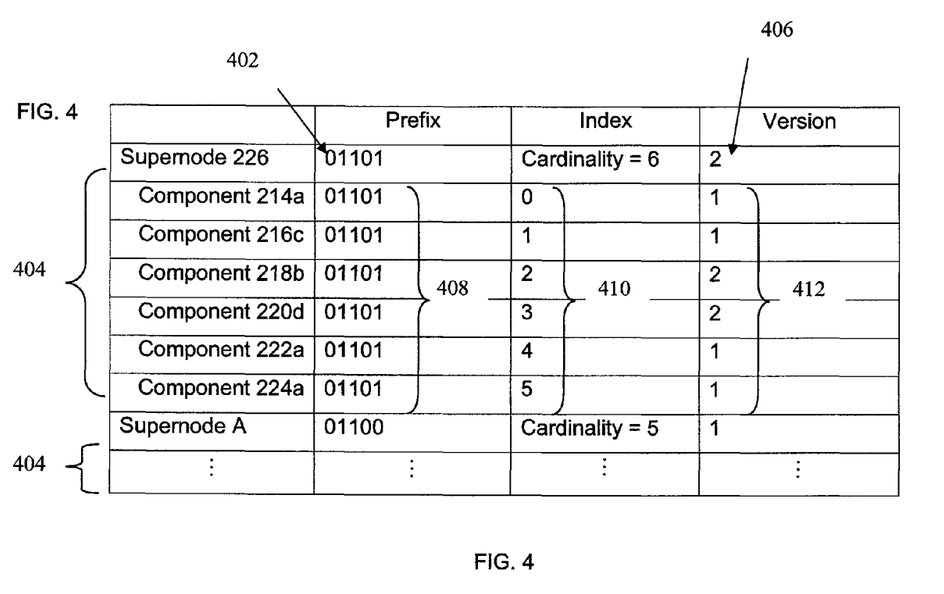
FIG. 4 is a depiction of data to be stored in a peer to peer network.

FIG. 4 is an exemplary supernode composition and component description table 400 according to an embodiment of the present invention. The supernode composition and component description table 400 may be used in conjunction with the peer to peer network 200, for example. Each supernode (e.g., supernode 226) is described by a supernode composition (e.g., with supernode composition and component description table 400) comprising the supernode prefix 402, an array 404 of the component descriptions, and a supernode version 406. Since each component has a description as described below, the array 402 size is equal to the supernode cardinality. The supernode version 406 is a sequence number corresponding to the current incarnation of the supernode. Each supernode is identified by a fixed prefix 402 as described above and in U.S. patent application Ser. No. 10/813,504, now U.S. Pat. No. 7,304,994, issued on Dec. 4, 2007. For example, in hashing and/or storing data in peer to peer network 200 according to supernode composition and component description table 400 in which hash keys are fixed size bit strings, the supernode 226 has a fixed prefix of 01101. Therefore, any data that has a hash key beginning with 01101 will be associated with supernode 226.

In operation, each component (e.g., 214b, 216c, 218b, 220d, 222a, 224a, etc.) in the component array 404 is described by a component description comprising a fixed prefix 408, a component index 410, and a component version 412. All components of the supernode (e.g., in array 404) are also assigned the same fixed prefix for their lifetime. The component index 410 of each component corresponds to a location in the supernode array. A component's index is fixed for the component's lifetime and is an identification number pointing to the particular component. A component index is a number between 0 and (supernode cardinality—1). A component's version is a version number sequentially increased whenever the component changes hosts (e.g., nodes). In some embodiments, described in detail below, a component may be split or moved from one physical node to another and its version is increased in such instances.

Supernode composition and component description table 400 is an example of an organization of the information related to physical nodes, supernodes, and their respective components. Of course, one skilled in the art would recognize other methods of organizing and providing such information, such as storing the information locally on physical nodes in a database, storing the information at a remote location in a communal database, etc.

Updated indications of the supernode composition are maintained (e.g., in supernode composition and component description table 400, etc.) to facilitate communication amongst peers. Further, physical nodes associated with the components maintain compositions of neighboring physical and/or virtual nodes. To maintain such compositions, physical nodes associated with components ping peers and neighbors as is known. In this way, a physical node associated with a component may internally ping physical nodes associated with peers in the component's supernode to determine virtual node health and/or current composition. Further, a physical node associated with a component may externally ping physical nodes associated with neighbors (e.g., components with the same index, but belonging to a different supernode) to propagate and/or collect composition information. Of course, other systems and methods of organizing and/or keeping track of supernodes and their components, including version/incarnation information may be used as appropriate.

Figure 5:
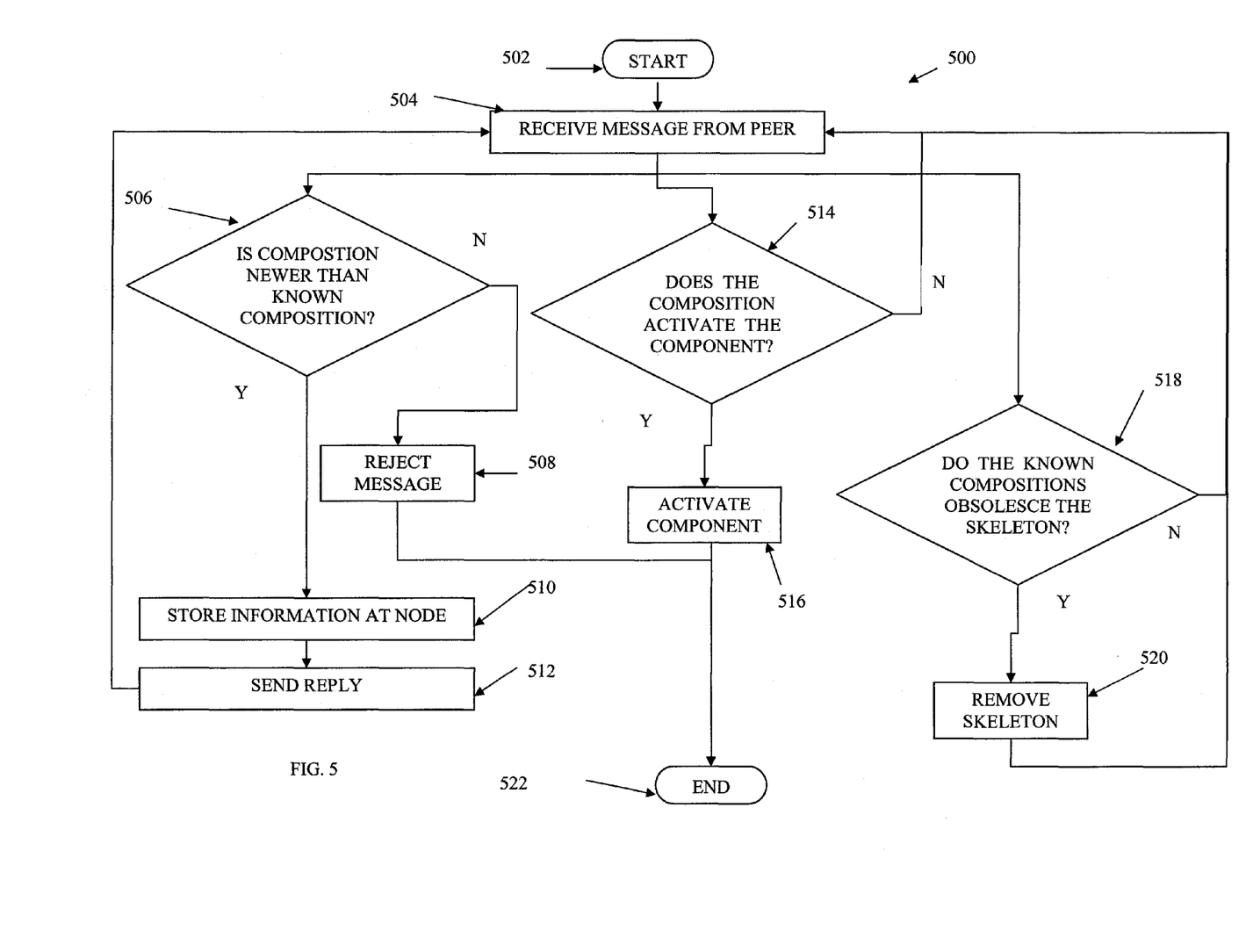
FIG. 5 is a flowchart of a method of storing data in a fixed prefix peer to peer network according to an embodiment of the present invention.

FIG. 5 is flowchart of a method 500 of organizing a framework (e.g., a skeleton) of a component in a fixed prefix peer to peer network with supernodes. A component skeleton may be organized (e.g., created and/or stored) on a physical node (e.g., physical nodes 202-212) to reserve storage space for a component (e.g., components 214a-d, 216a-d, 218a-d, 220a -d, 222a-d, 224a-d, etc.). That is, the component skeleton may provide indication the a slot on the physical node is utilized. The method begins at step 502.

In step 504, a message is received from a remote peer (e.g., another component of a supernode and/or physical node) at a destination node (e.g., physical nodes 202-212). The message may contain information about the description (e.g., composition) of the remote peer as described above with respect to FIG. 4. The composition may be as discussed above and/or may include a composition identification of the remote peer including a prefix and composition version number. The method may proceed simultaneously and/or in series to method steps 506, 514, and/or 518.

In step 506, a determination is made as to the age (e.g., incarnation, version, etc.) of the composition. If the composition is older than the newest composition known by the destination node (e.g., if the composition has a lower version number), the message is rejected at step 508 and the method ends at step 522. If the composition is newer than the youngest composition known by the destination node (e.g., if the composition has a higher version number), the method proceeds to step 510. Here, a composition is "known by" a node if the node has such information stored at the node, if the node has received information indicative of such compositions, and/or if the node has access to (e.g., via a controller 700 and/or supernode composition and component description table 400) such information.

In step 510, information about the skeleton (e.g., a composition and/or component index) is stored at the destination node. In this way, a component skeleton is created. A reply message is then sent to the originating node (e.g., the remote peer) in step 512 indicating success or failure of component creation.

Following step 512, the method 500 may return control to step 504. That is, after a skeleton is created, the physical node hosting the skeleton receives information about each new composition and determines if the newly received composition is newer than the present composition. If the newly received composition is newer, it replaces the older composition at the node (e.g., is stored as in step 510).

In step 514, a check is performed to determine if the present composition activates the component related to the component skeleton. A composition activates the component if the composition is newer than the composition that is part of the skeleton identifier, has the same index as the component, the same prefix or a longer prefix than the skeleton, and the incarnation of the physical node hosting the component is the same incarnation as the new component. In step 516, the component is activated. That is, the component is hosted on the new physical node. If the composition does not activate the component, the method returns control to step 504 to receive more messages.

In step 518, a check is performed to determine if the known compositions (e.g., all the compositions received in messages in step 504) obsolesce component skeleton. The component skeleton is determined to be obsolete if a set of the known compositions are newer than the component skeleton's composition and all of the compositions of the set cover the space represented by the skeleton's prefix and index. Here, the space represented by the skeleton's prefix and index is the Cartesian product of hashing space and index space spanning from zero to supernode cardinality minus one. If the component skeleton is obsolete, the skeleton is removed in step 520. If it is not, the method returns control to step 504 to receive more messages. The method ends at step 522.

FIGS. 6A and 6B depict a flowchart of a method 600 of operation of nodes in a fixed prefix peer to peer network according to an embodiment of the present invention. The method 600 may be performed in a network as described above with respect to FIGS. 1-4 wherein the fixed prefix network extends an FPN to include supernodes. Further, conventional functions of peer to peer networks, especially FPNs as disclosed in U.S. patent application Ser. No. 10/813,504, filed Mar. 30, 2004, now U.S. Pat. No. 7,304,994, issued on Dec. 4, 2007, and Incorporated herein by reference, may be modified for use with the present invention. Accordingly, it should be understood that certain method steps of method 600 described herein may be performed in other orders and are meant to be illustrative. One of skill in the art would recognize the necessary modifications to the conventional use of a peer to peer network that would be applied with an FPN/SN system described herein. The method starts at step 602 in FIG. 6A.

In step 604, a new physical node is added. The physical node may be a physical node similar to physical nodes 102-108, 202-212, and 302-308 of FIGS. 1, 2, and 3, respectively.

In step 606, the new physical node locates a live physical node in a peer to peer network (e.g., networks 100, 200, 300, etc.). To find a live physical node, the new physical node may locate the live node via a predetermined (e.g., user supplied, system supplied, etc.) list of nodes in the network. In the context of the present invention, a live node is a node having data currently stored thereon. In an alternative embodiment, the new physical node may use a Service Location Protocol (SLP) as is known to find one or more live physical nodes in the network.

In step 608, an empty physical node method is performed. A physical node may be considered to be "empty" where there are no active components (e.g., components 214a-d, 216a-d, 218a-d, 220a-d, 222a-d, and 224a-d), no obsolete components, no component skeletons (as described above with respect to FIG. 5), and no user supplied data stored at the node. Accordingly, method step 608 may be performed whenever a physical node in a fixed prefix network with supernodes is found to be empty even if it is not a newly added node from step 604. The method may be performed as follows:

The empty node transmits a number of empty node probes to nodes that have been identified as having more than one component from their node statistics. Node statistics may be a summary of information about a physical node such as the number of used slots, the number of free slots, the number of hosted components, total storage size, free disk space, etc. If there are not enough nodes, the empty node transmits the remainder of the necessary probes by generating random long prefixes and transmitting the empty node probes to those prefixes. In embodiments having a relatively small number of physical nodes, all nodes may be contacted. In embodiments having large numbers of nodes (e.g., thousands, etc.), a predetermined portion (e.g., 10-20%) may be contacted.

Figure 6:
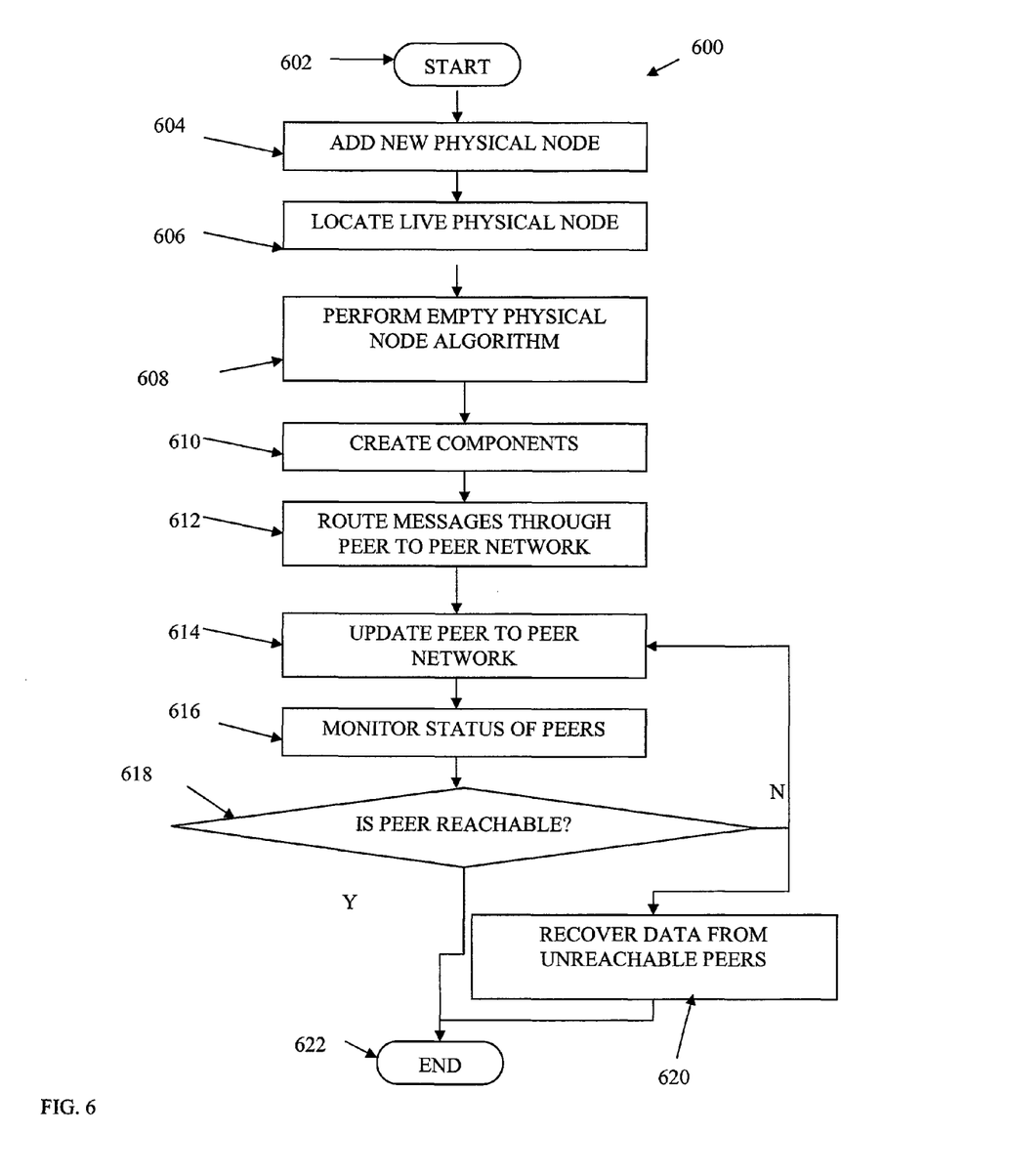
FIG. 6 shows a flowchart of a method of operation of a node in a fixed prefix peer to peer network according to an embodiment of the present invention.
Figure 7:
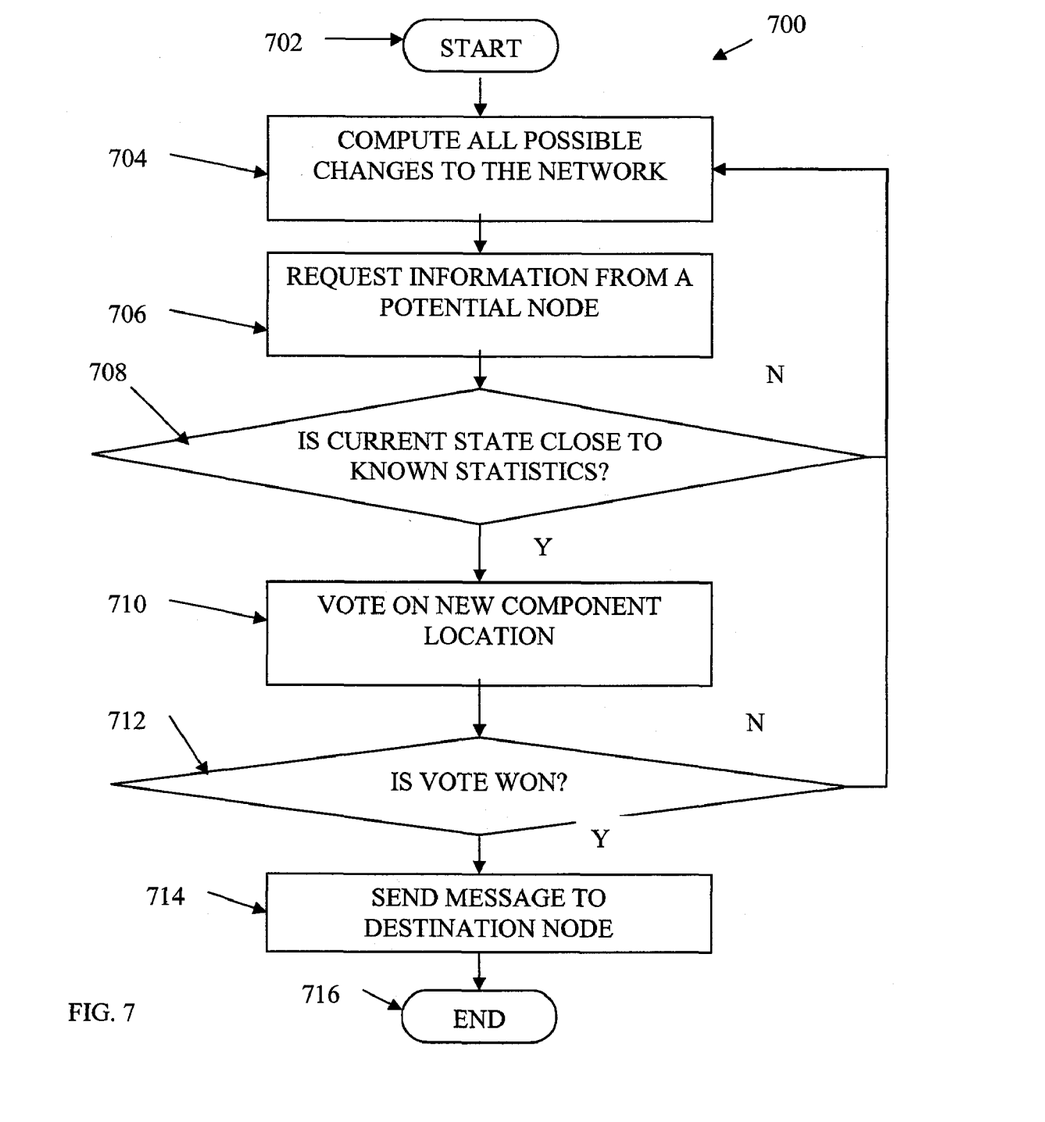
FIG. 7 shows a flowchart of a generic change method.

Subsequently, the nodes receiving the empty node probes reply with messages comprising compositions of their components, storage size of their slots (e.g., size of their components), and node statistics. The recipient nodes also update their lists of remote statistics with statistics of the empty node that sent the empty node probe and begin transfer-recovery procedures. In some embodiments, the transfer-recovery procedures may be entropy based transfer-recovery procedures such as the generic change method 700 discussed below.

A check is then performed to determine if any components were created on the empty node (e.g., as in step 610 below). If any components were created, the method passes to step 612. If no components were created, the method continues and the empty node transmits requests for data. This request may be a request for an eager (e.g., preemptive) split sent to any of the physical nodes that have replied to the empty node probes transmitted in step 608a. In at least one embodiment, the request is sent to the physical node with the shortest prefix or, if more than one prefix is equally short, the request is sent to the physical node hosting the largest component (e.g., the physical node with the most data in a single storage slot). The request for data may further include eager split requests transmitted to all of the physical nodes that host components, which are in the supernode of the component hosted on the physical node, first contacted. Step 608 is repeated iteratively until the empty physical node is no longer empty.

In step 610, components are created. It may be understood that component creation is a logical construction and that any appropriate method of recording and/or organizing the information (e.g., as in table 400) to achieve the organization described herein may be used, including software and/or electronics. Components may be created by an explicit management command. In an alternative embodiment, a component is created as in method steps 514 and 516 above.

In step 612, messages are routed through the peer to peer network (e.g., network 200). Messages, requests, and/or other information may be routed similarly to prior peer to peer networks using DHTs.

In a stable peer to peer network 200, messages may be routed between physical nodes associated with components of supernodes (e.g., supernode 226, etc.) in which the components have the same index as the component initiating the routing. The routing differs from routing in prior peer to peer networks in the last hop. Here, the message is passed from the first physical node associated with the component in the supernode that receives the message directly to the physical node associated with the destination component.

In a changing peer to peer network 200 (e.g., a network in which nodes and/or components are changing), a list of slots in physical nodes 202-212 that have already been contacted with a given message and are determined to be unreachable is maintained. Additionally a list of nodes 202-212 already contacted with a given message may be maintained as a "blacklist." The message may then be sent to one of the peers of the destination. For example, if a message is destined for slot 214b but the slot is determined to be unreachable, the message may be sent to one or more of slots 216c, 218b, 220d, 222a, and/or 224a. After such a hop, the source peer is added to the blacklist. After being sent to a peer of the destination, routing as is known may be resumed.

At step 614, the peer to peer network is updated. The update of the peer to peer network may be a transfer of a component from a local node to a remote node, a recovery of a component (e.g., after a node failure, node loss, etc.), a local split of a component and its associated storage slot when the storage slot reaches a predetermined capacity, and/or an eager split to create a component to be transferred to an empty node as in method step 608 above. Other network updates may be performed as well, such as node addition, node deletion, system recovery after failure, etc. The updating of the peer to peer network may comprise determining a transfer and/or new location for a component, storage slot, and/or physical node. This determination may be performed with a generic change method. An exemplary generic change method is discussed below with respect to FIG. 7.

In step 616, peers in a peer to peer network monitor the status of other peers. In at least one embodiment, the peers (e.g., physical nodes and/or components) ping each other to detect unreachable peers. A peer may be considered unreachable after a predetermined threshold of pings are not delivered from a first peer to a second peer (e.g., from node 202 to node 204 in peer to peer network 200 and/or from component 214b to component 216c in supernode 226).

In step 618, the status of a peer is determined. That is, according to the pings described in step 616 or another method, the status, health, and/or reachability of a physical node and/or component (e.g., a peer) may be determined. If the peer is determined to be unreachable, the method may pass back to step 614 and the peer to peer network may be updated. If a peer is determined to be reachable, the method may pass to step 622.

Similarly, the method may pass to step 620 and the data in the unreachable peers is recovered. As described in concurrently filed, commonly assigned and co-pending U.S. patent application Ser. No. 12/023,133, filed on Jan. 31, 2008, entitled "Method and Apparatus for Storing Data in a Peer to Peer Network," incorporated by reference herein, blocks of data may be erasure coded into a plurality of data fragments—a number of original data fragments and a number of redundant data fragments. The data fragments may be stored in storage slots on the physical nodes of a peer to peer network and their storage locations may be represented (e.g., associated) as components in a virtual node (e.g., a supernode). Since only a portion (e.g., half plus one) of the data fragments must be used to recover the original block of data, the remaining peers are likely to have enough fragment to recover the original data. As such, the peer to peer network may download (e.g., access as in DHT networks) the remaining data fragments from the reachable peers and reconstitute the original block of data in accordance with known methods.

In this way, network resiliency is improved. Since each supernode includes the fragments derived from an original block of data (e.g., by erasure coding) and each of the fragments is thus stored on a separate physical node, the network is less susceptible to failure due to network changes. That is, changes to the peer physical nodes such as failures and node departures are less likely to affect the peer to peer network because of the distributed nature of the data.

The method ends at step 622.

FIG. 7 depicts a flowchart of a generic change method 700 as discussed above with respect to FIG. 6. The method begins at step 702. In step 704, the peer to peer network or a portion of the peer to peer network (e.g., one or more physical nodes) computes all possible changes to the peer to peer network and their associated entropy values as is known.

In step 706, a physical node requests information from a potential destination node (e.g., the new node and/or the new host of a component). The information request may include a request to verify the current state described by the destination nodes statistics.

In step 708, a determination is made as to the current state of the potential destination node. If the current state of the potential destination node is close to the statistics known by the peer to peer network, a component skeleton is created as in method 500 and the method passes to step 710. If the current state of the potential destination node is not close to the statistics known by the peer to peer network, the method returns to step 704.

In step 710, the new component location is voted on. The voting may comprise using a distributed consensus method such that at least half plus one of the supernode cardinality number of peers in the peer to peer network must agree for a vote to be successful. In at least one embodiment, a Ben-Or method may be used. Of course, any appropriate distributed consensus method or other voting scheme may be used.

In step 712, a determination is made of the outcome of the vote. If the vote is lost, the change is abandoned and the method returns to step 704. If the vote is won, the prior location of the component (if any) becomes obsolete and the new location is used. With either result, a message is sent to the destination node with the new composition in step 714. A new component is then created on the destination node as in step 610 of method 600. Thus, the generic change method described in method 700 may be used for any transfer and/or split of data and/or components. The method ends at step 716.

Figure 8:
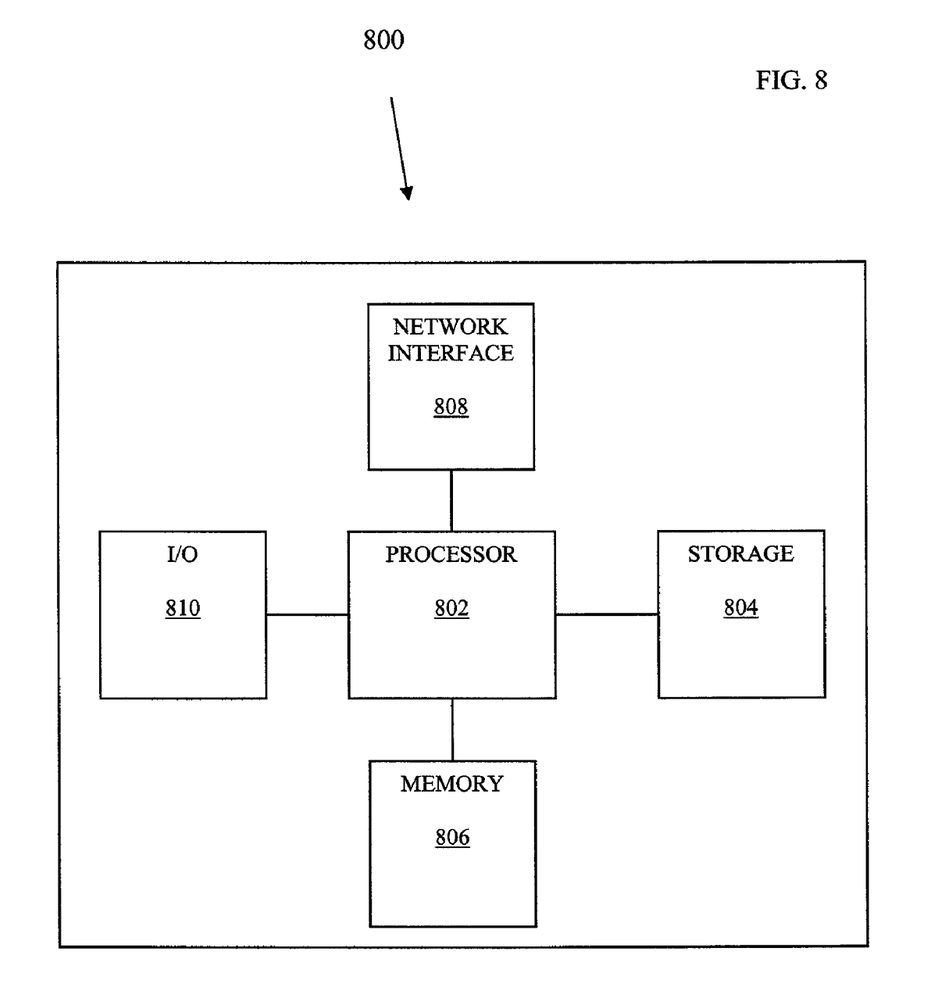
FIG. 8 is a schematic drawing of a controller.

FIG. 8 is a schematic drawing of a controller 800 according to an embodiment of the invention. Controller 800 contains a processor 802 that controls the overall operation of the controller 800 by executing computer program instructions that define such operation. The computer program instructions may be stored in a storage device 804 (e.g., magnetic disk, database, etc.) and loaded into memory 806 when execution of the computer program instructions is desired. Thus, applications for performing the herein-described method steps, such as erasure coding, storing data, and DHT organization, in methods 500, 600, and 700 are defined by the computer program instructions stored in the memory 806 and/or storage 804 and controlled by the processor 802 executing the computer program instructions. The controller 800 may also include one or more network interfaces 808 for communicating with other devices via a network (e.g., a peer to peer network, etc.). The controller 800 also includes input/output devices 810 (e.g., display, keyboard, mouse, speakers, buttons, etc.) that enable user interaction with the controller 800. Controller 800 and/or processor 802 may include one or more central processing units, read only memory (ROM) devices and/or random access memory (RAM) devices. One skilled in the art will recognize that an implementation of an actual controller could contain other components as well, and that the controller of FIG. 8 is a high level representation of some of the components of such a controller for illustrative purposes.

According to some embodiments of the present invention, instructions of a program (e.g., controller software) may be read into memory 806, such as from a ROM device to a RAM device or from a LAN adapter to a RAM device. Execution of sequences of the instructions in the program may cause the controller 800 to perform one or more of the method steps described herein, such as those described above with respect to methods 500, 600, and 700. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 806 may store the software for the controller 800, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of operation of a first physical node in a peer to peer network comprising a plurality of physical nodes, each having a plurality of storage slots, comprising:
    logically associating a set of components as a virtual node by assigning the same fixed-size hash-key prefix to the set of components such that fragments of an object associated with a hash-key, which is derived by applying a hash function to the object, that matches the hash-key prefix are distributively stored in storage slots of different physical nodes on which the set of components are hosted;
    receiving at the first physical node a message comprising identification information indicative of a version of a given component hosted on a second physical node and included in the set of components;
    determining a relative age of the given component based on the identification information; and
    if the version of the given component hosted on the second physical node is newer than a version of the given component hosted on the first physical node, storing the identification information as a component skeleton at a storage slot on the first physical node.

2. The method of claim 1 further comprising:
    determining if the identification information stored at the storage slot on the first physical node activates a particular component; and
    if the identification information activates the particular component, activating the particular component.

3. The method of claim 2, wherein the determining if the identification information stored at the storage slot on the first physical node activates a particular component comprises:
    determining if the identification information identifies the same index as the particular component;
    determining if the identification information identifies the same prefix or a longer prefix than the component skeleton; and
    determining if an incarnation of the first physical node is the same as an incarnation of the particular component.

4. The method of claim 2, wherein activating the particular component comprises:
    hosting the particular component on the first physical node.

5. The method of claim 1, wherein the virtual node is a supernode.

6. A method of operation a node of a peer to peer network comprising a plurality of physical nodes, each having a plurality of storage slots, comprising:
    associating a plurality of components with a plurality of the storage slots;
    associating each component with the physical node that has the storage slot that hosts the component;
    associating a set of the components logically as a virtual node by assigning the same fixed-size hash-key prefix to the set of components such that fragments of an object associated with a hash-key, which is derived by applying a hash function to the object, that matches the hash-key prefix are distributively stored in storage slots of different physical nodes on which the set of components are hosted;
    communicating between the physical nodes associated with the components to determine if one of the components is lost; and
    if one of the components is lost, initiating a recovery procedure.

7. The method of operation of a peer to peer network of claim 6, wherein the recovery procedure comprises:
    evaluating a plurality of new host locations for a replacement component;
    voting on the plurality of new host locations; and
    creating the replacement component from data in the remaining components.

8. The method of claim 6, wherein the virtual node is a supernode.

9. A machine readable medium having program instructions stored thereon, the instructions capable of execution by a processor and defining the steps of:
    receiving at a first physical node in a peer to peer network comprising physical nodes, each having a plurality of storage slots, a set of the storage slots on a plurality of the physical nodes hosting components and logically organized into a virtual node by assigning the same fixed-size hash-key prefix to the set of storage slots such that fragments of an object associated with a hash-key, which is derived by applying a hash function to the object, that matches the hash-key prefix are distributively stored in the set of storage slots, a message comprising identification information indicative of a version of a given component hosted on a second physical node;

determining a relative age of the given component based on the identification information; and if the version of the given component hosted on the second physical node is newer than a version of the given component hosted on the first physical node, storing the identification information as a component skeleton at a storage slot on the first physical node.

10. The machine readable medium of claim 9, wherein the instructions further define the steps of:

determining if the identification information stored at the storage slot on the first physical node activates a particular component; and if the identification information activates the particular component, activating the particular component.

11. The machine readable medium of claim 10, wherein the instructions for determining if the identification information stored at the storage slot on the first physical node activates a particular component further define the steps of:

determining if the identification information identifies the same index as the particular component;

determining if the identification information identifies the same prefix or a longer prefix than the component skeleton; and determining if an incarnation of the first physical node is the same as an incarnation of the particular component.

12. The machine readable medium of claim 10 wherein the instructions further define the steps of:

hosting the particular component on the first physical node.

13. A machine readable medium having program instructions stored thereon, the instructions capable of execution by a processor in a peer to peer network comprising a plurality of physical nodes each having a plurality of storage slots and defining the steps of:

associating a plurality of components with a plurality of the storage slots;

associating each component with the physical node that has the storage slot that hosts the component;

associating a set of the components logically as a virtual node by assigning the same fixed-size hash-key prefix to the set of components such that fragments of an object associated with a hash-key, which is derived by applying a hash function to the object, that matches the hash-key prefix are distributively stored in storage slots of different physical nodes on which the set of components are hosted;

communicating between the physical nodes associated with the components to determine if one of the components is lost; and if one of the components is lost, initiating a recovery procedure.

14. The machine readable medium of claim 13 wherein the instructions for the recovery procedure further define the steps of:

evaluating a plurality of new host locations for a replacement component;

voting on the plurality of new host locations; and creating the replacement component from data in the remaining components.

15. A first physical node in a peer to peer network comprising a plurality of physical nodes, each having a plurality of storage slots, comprising:

means for logically associating a set of components as a virtual node by assigning the same fixed-size hash-key prefix to the set of components such that fragments of an object associated with a hash-key, which is derived by applying a hash function to the object, that matches the hash-key prefix are distributively stored in storage slots of different physical nodes on which the set of components are hosted;

means for receiving at the first physical node a message comprising identification information indicative of a version of a given component hosted on a second physical node and included in the set of components;

means for determining a relative age of the given component based on the identification information; and if the version of the given component hosted on the second physical node is newer than a version of the given component hosted on the first physical node, means for storing the identification information as a component skeleton at a storage slot on the first physical node.

16. The first physical node of claim 15 further comprising:

means for determining if the identification information stored at the storage slot on the first physical node activates a particular component; and if the identification information activates the particular component, means for activating the particular component.

17. The first physical node of claim 16, wherein the means for determining if the identification information stored at the storage slot on the first physical node activates a particular component comprises:

means for determining if the identification information identifies the same index as the particular component;

means for determining if the identification information identifies the same prefix or a longer prefix than the component skeleton; and means for determining if an incarnation of the first physical node is the same as an incarnation of the particular component.

18. The first physical node of claim 16, wherein the means for activating the component comprises:

means for hosting the particular component on the first physical node.

19. A node of a peer to peer network comprising a plurality of physical nodes each having a plurality of storage slots comprising:

means for associating a plurality of components with a plurality of the storage slots;

means for associating each component with the physical node that has the storage slot that hosts the component;

means for associating a set of the components logically as a virtual node by assigning the same fixed-size hash-key prefix to the set of components such that fragments of an object associated with a hash-key, which is derived by applying a hash function to the object, that matches the hash-key prefix are distributively stored in storage slots of different physical nodes on which the set of components are hosted;

means for communicating between the physical nodes associated with the components to determine if one of the components is lost; and if one of the components is lost, means for initiating a recovery procedure.

20. The node of a peer to peer network of claim 19, wherein the means for initiating a recovery procedure comprises:
  means for evaluating a plurality of new host locations for a replacement component;
  means for voting on the plurality of new host locations; and
  means for creating the replacement component from data in the remaining components.

* * * * *